| United States Patent [19] | [11] | 4,452,742 |
|---|---|---|
| Stawitz | [45] | Jun. 5, 1984 |

[54] PROCESS FOR THE PREPARATION OF 4,4'-DIAMINO-1,1'-DIANTHRIMIDES

[75] Inventor: Josef Stawitz, Cologne, Fed. Rep. of Germany

[73] Assignee: Bayer Aktiengesellschaft, Leverkusen, Fed. Rep. of Germany

[21] Appl. No.: 445,293

[22] Filed: Nov. 29, 1982

[30] Foreign Application Priority Data

Dec. 9, 1981 [DE] Fed. Rep. of Germany ....... 3148693

[51] Int. Cl.³ .............................................. C01C 50/16
[52] U.S. Cl. .................................................... 260/367
[58] Field of Search .......................................... 260/367

[56] References Cited

U.S. PATENT DOCUMENTS

| 1,994,622 | 3/1935 | Schmidt et al. | 260/367 |
| 2,454,679 | 11/1948 | Smyth | 260/367 |
| 2,590,825 | 3/1952 | Scalera et al. | 260/367 |
| 3,194,820 | 7/1965 | Grelat | 260/367 |

FOREIGN PATENT DOCUMENTS

| 1085991 | 7/1958 | Fed. Rep. of Germany | 260/367 |
| 1191061 | 11/1961 | Fed. Rep. of Germany | 260/367 |
| 2153383 | 5/1973 | Fed. Rep. of Germany | 260/367 |
| 573959 | 3/1976 | Switzerland | 260/367 |
| 1550504 | 8/1979 | United Kingdom | 260/367 |

OTHER PUBLICATIONS

*The Merck Index,* 8 ed. 1968, Stecher et al., editor, pp. 212.
*The Chemistry of Synthetic Dyes,* vol. II, 1952, Venkatoraman, pp. 892–895.

*Primary Examiner*—Natalie Trousof
*Assistant Examiner*—Raymond Covington
*Attorney, Agent, or Firm*—Sprung, Horn, Kramer & Woods

[57] ABSTRACT

Process for the preparation of 4,4'-diamino-1,1'-dianthrimides, characterized in that a mixture of an optionally substituted 1,4-diaminoanthraquinone and an optionally substituted 1-aminoanthraquinone in 30–60% strength $H_2SO_4$, preferably 40–60% strength $H_2SO_4$, is oxidized with peroxomonosulphuric acid or peroxodisulphuric acid, which are preferably employed in the form of the alkali metal or ammonium salts, and the product is then reduced.

13 Claims, No Drawings

PROCESS FOR THE PREPARATION OF 4,4'-DIAMINO-1,1'-DIANTHRIMIDES

The invention relates to a process for the preparation of 4,4'-diamino-1,1'-dianthrimides, which is characterised in that a mixture of an optionally substituted 1,4-diaminoanthraquinone and an optionally substituted 1-aminoanthraquinone in 30–60% strength $H_2SO_4$, preferably 40–60% strength $H_2SO_4$, is oxidised with peroxomonosulphuric acid or peroxodisulphuric acid, which are preferably employed in the form of the alkali metal or ammonium salts, and the product is then reduced. Preferably, the two starting components in the process according to the invention are employed in the molar ratio of optionally substituted 1-aminoanthraquinone to optionally substituted 1,4-diaminoanthraquinone of 0.9:1 to 1.4:1, particularly preferably 1:1 to 1.1:1.

It is expedient to employ a finely divided mixture of the anthraquinones.

In general, the oxidation is carried out at temperatures of about 0° to about 80° C., preferably about 30° to about 60° C.

Potassium peroxodisulphate is a particularly preferred oxidising agent.

4,4'-Diamino-1,1'-dianthrimides can be prepared essentially by two processes:

1. Condensation of optionally substituted 1-chloroanthraquinone with an optionally substituted 1-aminoanthraquinone under copper catalysis by an Ullmann reaction (Ullmann's Enzyklopädie der techn. Chemie (Ullmann's Encyclopaedia of Industrial Chemistry), Volume 7, page 585, 3rd edition, 1974), nitration of the produced dianthrimide, which is unsubstituted in the 4 and 4' positions, in borosulphuric acid and reduction of the 4,4'-dinitro-1,1'-dianthrimide obtained.

2. Condensation of optionally substituted 4-benzoylamino-1-chloroanthraquinone with optionally substituted 1-amino-4-benzoylaminoanthraquinone, under copper catalysis, and hydrolysis of the benzoylamino groups in accordance with the process of Swiss Patent Specification No. 573,959.

Oxidation of a mixture of 1,4-diaminoanthraquinone and 1-aminoanthraquinone to give 4,4'-diaminodianthrimide is known from Houben/Weyl (Volume 7, Part 3, page 213, 4th edition). According to this reference, the dianthrimide should be produced when the components mentioned are treated with manganese dioxide in 85 to 96% strength $H_2SO_4$. Repeating this work shows that, in such highly concentrated $H_2SO_4$, the reaction either occurs not at all or with extremely unsatisfactory results in respect of yield and quality of the final product.

Surprisingly, 4,4'-diaminodianthrimides can be prepared by the process according to the invention in a short time, in high purity and in good yields.

It is particularly surprising that (a) the anthraquinone-1,4-diimine, which is formed as an intermediate under the oxidation conditions and which is sensitive to hydrolysis, reacts almost quantitatively with 1-aminoanthraquinone in the $H_2SO_4$, which contains a large amount of water, to give 4,4'-diaminodianthrimide;

(b) the dianthrimide or its quinoneimine, which is already formed under the reaction conditions, is hydrolysed if at all, only to a very small extent to 1,4-diaminoanthraquinone and 4-amino-1-hydroxyanthraquinone;

(c) the competing reaction of self-condensation of 1-aminoanthraquinone to give aminotrianthrimides or aminopolyanthrimides, according to German Auslegeschrift No. 2,085,991, occurs, if at all, to only a very small extent.

The process according to the invention is also superior to known processes because of its simplicity, the briefness of the reaction time and the dispensing with organic solvents and heavy metal compounds. Furthermore, 4,4'-diaminodianthrimides, which can only be prepared with difficulty by the known processes, are easily accessible with this process.

In the process according to the invention, preferably about 1.0 to about 2.5 mol, in particular 1.6 mol to 2.2 mol, of oxidising agent are employed per mol of optionally substituted 1,4-diaminoanthraquinone.

The oxidation can be accelerated by the addition of heavy metal salts or oxides, such as $MnO_2$, $KMnO_4$, $CrO_3$, $K_2Cr_2O_7$, $Na_2Cr_2O_7$ and the like. The addition of the heavy metal compounds is preferably in catalytic amounts.

For the reduction, the known reducing agents which are active in a sulphuric acid medium, such as $SnCl_2$, $FeSO_4$, $SO_2$, dihydroxybenzenes and trihydroxybenzenes, alkali metal salts of oxo and thio acids of low-valent sulphur, and oxygen acids of phosphorus in low oxidation states, and their salts, can be used. The preferred reducing agents are $FeSO_4$, $Na_2SO_3$, $NaHSO_3$ and $H_3PO_3$, $H_3PO_2$ and their alkali metal salts. Of course, mixtures of the reducing agents mentioned can also be employed.

In the process, preferably 1-aminoanthraquinones of the formula

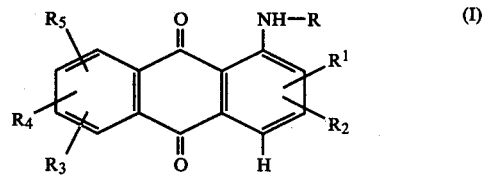

in which

R designates hydrogen, alkyl, in particular $C_1$–$C_6$-alkyl, cycloalkyl, in particular $C_3$–$C_7$-cycloalkyl, aryl, in particular phenyl and naphthyl, aralkyl, in particular phenyl-$C_1$–$C_6$-alkyl, it being possible for the hydrocarbon radicals mentioned to be substituted and $R_1$, $R_2$, $R_3$, $R_4$ and $R_5$ designate hydrogen, halogen, in particular Cl and Br, $-NO_2$, $-SO_3H$, $-COOH$, $-OH$, $-NH_2$, $-CN$, arylamino, in particular phenylamino and naphthylamino, alkylamino, in particular $C_1$–$C_6$-alkylamino, alkyl, in particular $C_1$–$C_6$-alkyl, cycloalkyl, in particular $C_3$–$C_7$-cycloalkyl, aryl, in particular phenyl and naphthyl, aralkyl, in particular phenyl-$C_1$–$C_6$-alkyl, alkoxy, in particular $C_1$–$C_6$-alkoxy and aryloxy, in particular phenoxy, are employed.

R preferably represents hydrogen.

$R_1$, $R_2$, $R_3$, $R_4$ and $R_5$ preferably represent hydrogen, Cl, Br, $-SO_3H$, $-COOH$, $-OH$, $-NH_2$, $-CN$, $-NO_2$, $C_1$–$C_4$-alkyl, in particular methyl and ethyl, phenyl, $C_1$–$C_4$-alkylamino and phenylamino.

Examples which may be mentioned are: 1-aminoanthraquinone, 1-amino-5-chloroanthraquinone, 1-amino-8-chloroanthraquinone, 1-amino-5,8-dichloroanthraquinone, 1-aminoanthraquinone-2-sulphonic acid, 1-aminoanthraquinone-8-sulphonic acid, 1-amino-6-hydroxyanthraquinone, 1,5-diaminoanthraquinone, 1,8-diaminoanthraquinone, 1,5-diamino-4-chloroanthraquinone, -amino-5-nitroanthraquinone, 1-amino-8-nitroanthraquinone, 1-amino-2-methylanthraquinone, 1-amino-5-phenylaminoanthraquinone, 1-amino-8-phenylaminoanthraquinone, 1-amino-5-methylaminoanthraquinone and 1-amino-8-methylaminoanthraquinone.

In particular, 1,4-diaminoanthraquinones of the formula

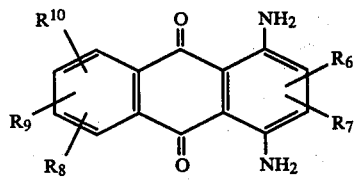

have been employed in the process according to the invention. In formula II:

$R_6$, $R_7$, $R_8$, $R_9$ and $R_{10}$ designate hydrogen, halogen, in particular Cl and Br, —$NO_2$, —$SO_3H$, —COOH, —OH, —$NH_2$, —CN, arylamino, in particular phenylamino and naphthylamino, alkylamino, in particular $C_1$–$C_6$-alkylamino, alkyl, in particular $C_1$–$C_6$-alkyl, cycloalkyl, in particular $C_3$–$C_7$-cycloalkyl, aryl, in particular phenyl and naphthyl, aralkyl, in particular phenyl-$C_1$–$C_6$-alkyl, alkoxy, in particular $C_1$–$C_6$-alkoxy and aryloxy, in particular phenoxy. $R_6$, $R_7$, $R_8$, $R_9$ and $R_{10}$ preferably represent hydrogen, Cl, Br, —$SO_3H$, —COOH, —OH, —$NH_2$, —$NO_2$, —CN, $C_1$–$C_4$-alkyl, in particular methyl and ethyl, $C_1$–$C_4$-alkylamino and phenylamino.

Examples which may be mentioned are: 1,4-diaminoanthraquinone, 1,4-diaminoanthraquinone-5-sulphonic acid, 1,4-diaminoanthraquinone-6-sulphonic acid, 1,4-diaminoanthraquinone-7-sulphonic acid, 1,4-diaminoanthraquinone-8-sulphonic acid, 1,4-diamino-5-chloroanthraquinone, 1,4-diamino-6-chloroanthraquinone, 1,4-diamino-7-chloroanthraquinone, 1,4-diamino-8-chloroanthraquinone, 1,4-diamino-5-bromoanthraquinone, 1,4-diamino-6-bromoanthraquinone, 1,4-diamino-7-bromoanthraquinone, 1,4-diamino-8-bromoanthraquinone, 1,4-diamino-5,8-dichloroanthraquinone, 1,4-diamino-5-nitroanthraquinone, 1,4-diamino-2-methylanthraquinone, 1,4-diamino-2-carboxyanthraquinone, 1,4-diamino-2-nitroanthraquinone, 1,4-diamino-2,3-dichloroanthraquinone and 1,4-diamino-2,3-dicyanoanthraquinone.

If optionally substituted 1-aminoanthraquinone in the process according to the invention is replaced by optionally substituted 1,5- or 1,8-diaminoanthraquinone, on using 1.8 to 2.0 mol of 1,4-diaminoanthraquinone, the double reaction to give the tetraaminotrianthrimide, in accordance with the following equation,

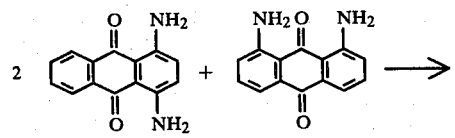

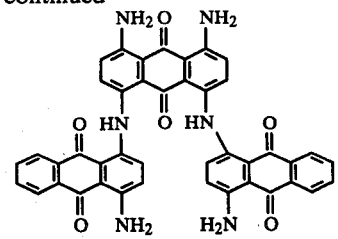

can also be achieved.

In the process according to the invention, a suspension of finely ground, optionally substituted, 1-aminoanthraquinone and optionally substituted 1,4-diaminoanthraquinone can be oxidised in 30–60% strength $H_2SO_4$. Preferably, the 1-aminoanthraquinone and the 1,4-diaminoanthraquinone are consecutively converted to a paste, but for economic reasons, they are particularly preferably converted to a paste together, since this procedure has no disadvantages in respect of the quality of the products.

In this process, the oxidising agent can be initially introduced in water, or in a mixture of sulphuric acid and water, and the aminoanthraquinones, mixed with sulphuric acid, added dropwise. However, it is advantageous to meter the oxidising agent continuously or in portions into the paste of aminoanthraquinones. The addition of the oxidising agent can be carried out within 0.5–5 hours.

The reaction of the 1,4-quinoneimine with the 1-aminoanthraquinone generally occurs rapidly even at low temperature. For economic reasons, and for reasons involving the stirrability, particularly when the reaction mixture is concentrated, a temperature of 10°–60° C., in particular 30°–50° C., is preferred for the reaction. The reaction is complete about 0.5–2 hours after addition of the oxidising agent. The course of the reaction can be followed analytically, for example, the amount of starting components can be found rapidly by known chromatographic processes.

The amount of sulphuric acid employed is determined by the solubility of the aminoanthraquinones in sulphuric acid and by the stirrability of the paste or oxidation melt. In general, about 10 to about 40 parts by weight of 40–60% strength $H_2SO_4$ are used per one part by weight of 1,4-diaminoanthraquinone.

The reduction of the quinoneimines of the diaminodianthrimides produced can be carried out with reducing agents alone or in the form of, for example, aqueous solutions. For this reaction, it is possible either to add the oxidation melt to the initially introduced reducing agent or to meter the reducing agent into the melt, the latter procedure having the advantage that oxidation and reduction can be carried out in the same vessel. It is possible to heat in order to complete the reduction.

Another possibility comprises isolating the completely or partially oxidised diaminodianthrimide and then reducing it, for example, by treatment with aqueous solutions of the reducing agents.

The claimed process becomes particularly economical when the 1,4-diaminoanthraquinone is prepared by oxidation of its precursor, the leuco-1,4-diaminoanthraquinone, in concentrated sulphuric acid, and is converted to a paste in water without intermediate isolation. The oxidation is preferably carried out with manganese dioxide, chlorine, sulphuryl chloride or bromine at 90°–110° C., as described in German Patent Specification No. 625,759 and German Patent Specification 627,482.

EXAMPLE 1

52.0 g of 1,4-diaminoanthraquinone (92% pure) and 47.0 g of 1-aminoanthraquinone (98% pure) are dissolved in 512 g of 96% strength $H_2SO_4$ and this solution is added dropwise, with efficient stirring, to 460 g of water within 30 minutes. After cooling to about 15° C., 110.0 g of potassium peroxodisulphate are added, with efficient stirring, within about 3 hours and the mixture is allowed to warm slowly to 20° C. The melt is stirred at about 20° C. for 2–3 hours and then added to a mixture of 600 ml of water and 150 ml of 40% strength $NaHSO_3$ solution and, after addition of a defoamer, the mixture is heated to 80°–90° C. in 30 minutes. After 30 minutes at 80°–90° C., the solid is filtered off hot with suction, washed with water to neutrality and dried at 100° C. 97.4 g of 4,4'-diamino-1,1'-dianthrimide (81% pure), corresponding to 86% of theory, were obtained.

EXAMPLE 2

A solution of 52.0 g of 1,4-diaminoanthraquinone (92% pure) and 47.0 g of 1-aminoanthraquinone (98% pure) in 410 g of 96% strength $H_2SO_4$ is added dropwise to 410 g of water. 95.0 g of potassium peroxodisulphate is introduced into the red-orange paste at 40°–50° C. within 1 hour, the mixture is stirred for approximately a further 30 minutes and the solid is filtered off with suction. The filter cake is washed to neutrality and then stirred briefly in a mixture of 100 ml of 40% strength $NaHSO_3$ solution and 400 ml of water. The solid is then filtered off with suction, washed with water and dried at 100° C. 96.5 g of 4,4'-diamino-1,1'-dianthrimide (84% pure), corresponding to 88% of theory, are isolated.

EXAMPLE 3

Chlorine is passed into a solution of 52.0 g of leuco-1,4-diaminoanthraquinone (94% pure) in 410 g of 96% strength $H_2SO_4$ at 100° C. until the leuco compound has virtually completely disappeared. Excess chlorine and hydrogen chloride are blown out with air. The mixture is then allowed to cool down to room temperature while introducing 48.0 g of 1-aminoanthraquinone and the solution is then added dropwise to 410 g of water. 95.0 g of potassium peroxodisulphate are introduced in portions at 40°–50° C. within about 1 hour. The mixture is allowed to stir for approximately a further 30 minutes, the solid is filtered off with suction and washed with water until almost neutral. The filter cake is washed with 300 ml of 10% strength $NaHSO_3$ solution and then with water and dried at 100° C. 102.3 g of 4,4'-diamino-1,1'-dianthrimide (79% pure), corresponding to 87% of theory, are obtained.

EXAMPLE 4

10.6 g of 1,4-diaminoanthraquinone (92% pure) and 15.5 g of sodium 1-aminoanthraquinone-2-sulphonate (90% pure) are introduced into 220 g of 96% strength $H_2SO_4$. The solution is added dropwise to 220 g of water within about 30 minutes. After cooling to about 15° C., 0.5 g of manganese dioxide is introduced with efficient stirring and then 22.0 g of potassium peroxodisulphate are introduced within 2.5 hours. The mixture is stirred a further 2–3 hours at 15°–20° C., 15.0 g of $SnCl_2.2H_2O$ in 30 ml of concentrated hydrochloric acid are added to the dark brown melt and it is stirred a further 1–2 hours. The mixture is then diluted with 500 g of water, heated to 80°–90° C., the solid is filtered off with suction and washed with 10% strength $H_2SO_4$, and then water at 50°–60° C. until neutral. After drying at 100° C., 18.7 g of 4,4'-diamino-1,1'-dianthrimide-3-sulphonic acid, corresponding to 84% of theory, which is already quite pure, are obtained. The potassium peroxodisulphate employed can also be replaced by an equivalent amount of ammonium peroxodisulphate without adverse effects.

EXAMPLE 5

A solution of 10.6 g of 98% pure 1,4-diaminoanthraquinone and 17.4 g of sodium 1-aminoanthraquinone-8-sulphonate (80.4% pure) in 220 g of 96% strength $H_2SO_4$ is stirred into 220 g of water with cooling. After cooling to 15° C., 22.0 g of potassium peroxodisulphate are introduced within 2–3 hours and the mixture is stirred at 15°–20° C. for a further 3–4 hours. Then 20 ml of aqueous $H_3PO_3$ solution (73% strength) are added dropwise, the mixture is stirred for 30 minutes and, after adding 6.0 g of $FeSO_4.7H_2O$ in 1 hour, is heated at 80°–90° C. for 1–2 hours. After cooling down, the solid is filtered off with suction, washed with water to neutrality and dried at 100° C. 19.6 g of 4,4'-diamino-1,1'-dianthrimide-5-sulphonic acid (about 90% pure) are isolated.

EXAMPLE 6

A solution of 10.0 g of 1,4-diaminoanthraquinone (92% pure) and 11.3 g of 8-amino-1-chloroanthraquinone (89% pure) in 180 g of 96% strength $H_2SO_4$ is added dropwise to 180 g of water in 30 minutes. After cooling to 10°–15° C., 21.0 g of potassium peroxodisulphate is introduced within 2 hours and the mixture is stirred at 15° C. for a further 3–4 hours. Then 40 ml of aqueous $NaHSO_3$ solution (40% strength) is added dropwise with efficient stirring, the mixture is stirred for a further 0.5–1 hour at 20°–25° C. and then heated for 30 minutes at 80°–90° C. while adding 30 ml of aqueous $NaHSO_3$ solution (40% strength) dropwise. The solid is filtered off hot with suction, washed with hot water to neutrality and dried at 100° C. Yield: 19.6 g of crude product. After purification via the sulphate, 15.6 g of 5-chloro-4,4'-diamino-1,1'-dianthrimide, corresponding to 83% of theory relative to 1,4-diaminoanthraquinone, are obtained.

EXAMPLE 7

A solution of 10.6 g of 1,4-diaminoanthraquinone (92% pure) and 15.3 g of 5-amino-1,4-dichloroanthraquinone (82% pure) in 180 g of 96% strength sulphuric acid is added dropwise, with cooling, to 180 g of water. 23.0 g of potassium peroxodisulphate are introduced into the melt at 15°–20° C. and the mixture is stirred for a further 2–3 hours at 15°–20° C. The dark melt is poured into a mixture of 500 ml of water and 200 ml of 40% strength $NaHSO_3$ solution and, after brief stirring, is heated at 80°–90° C. for 0.5–1 hour. The solid is filtered off hot with suction, washed with hot water to neutrality and dried at 100° C. From 23.8 g of crude product after purification via the sulphate, 16.1 g of pure 5,8-dichloro-4,4'-diamino-1,1'-dianthrimide, corresponding to 74% of theory, are isolated.

EXAMPLE 8

A solution of 10.6 g of 1,4-diaminoanthraquinone (92% pure) and 11.9 g of 1,5-diamino-4-chloroanthraquinone (98% pure) in 220 g of 96% strength H₂SO₄ is converted into a paste in 230 g of water, the melt is oxidised with 22.0 g of potassium peroxodisulphate and worked up in accordance with Example 5. 21.9 g of crude product are obtained and, after purification via the sulphate, 15.4 g of slightly impure 5-chloro-4,4′,8-triamino-1,1′-dianthrimide.

EXAMPLE 9

A solution of 10.0 g of 1,4-diaminoanthraquinone (92% pure) and 10.3 g of 1-amino-2-methylanthraquinone (91.5% pure) in 180 g of 96% strength H₂SO₄ is added dropwise, with cooling, to 170 g of water. 21.0 g of potassium peroxodisulphate are introduced at 15° C. within 2–3 hours and the dark melt is stirred a further 2–3 hours. The working up and purification via the sulphate in accordance with Example 5 provides 20.5 g of crude product and 12.3 g of pure 3-methyl-4,4′-diaminoanthrimide, corresponding to 67% of theory.

EXAMPLE 10

A solution of 12.2 g of 1,4-diaminoanthraquinone (92% pure) and 13.8 g of 1-methylaminoanthraquinone (89% pure) in 220 g of 96% strength H₂SO₄ is converted to a paste in 210 g of water. 21.0 g of potassium peroxodisulphate are introduced at 15° C. within 2–3 hours and the dark melt is stirred a further 2–3 hours. Then 16.0 g of $SnCl_2 \cdot 2H_2O$ in 30 ml of concentrated hydrochloric acid are added, after 1 hour the mixture is heated briefly to 80°–90° C., and the solid is filtered off with suction and washed with 20% strength H₂SO₄. 22.8 g of 4-amino-4′-methylamino-1,1′-dianthrimide (about 85–90% pure) are obtained.

EXAMPLE 11

A solution of 10.6 g of 1,4-diaminoanthraquinone (92% pure) and 14.0 g of 1-phenylaminoanthraquinone (91% pure) in 220 g of 96% strength H₂SO₄ is converted to a paste in 220 g of water. 22.0 g of potassium peroxodisulphate are introduced at 15° C. within 2–3 hours. After stirring for 2–3 hours, the melt is added to a mixture of 300 ml of water and 100 ml of 40% strength NaHSO₃ solution and heated at 80°–90° C. for 1 hour. The solid is filtered off with suction, washed with 30% strength H₂SO₄, then washed with hot water to neutrality and dried at 100° C. 15.6 g of virtually pure 4-amino-4′-phenylamino-1,1′-dianthrimide are obtained.

EXAMPLE 12

A solution of 10.6 g of 1,4-diaminoanthraquinone (92% pure) and 10.6 g of 1,8-diaminoanthraquinone (96% pure) in 200 g of 96% strength H₂SO₄ is converted to a paste in 210 g of water and the melt is oxidised with 22.0 g of potassium peroxodisulphate at 15° C. Working-up in accordance with Examples 5 provides 22.0 g of crude product and, after purification via the sulphate, 16.2 g of essentially pure 4,4′,5-triamino-1,1′-dianthrimide.

EXAMPLE 13

A solution of 22.0 g of 1,4-diaminoanthraquinone (92% pure) and 10.2 g of 1,8-diaminoanthraquinone (96% pure) in 220 g of 96% strength H₂SO₄ is added dropwise, with cooling, to a mixture of 220 g of water and 100 g of 50% strength H₂SO₄. 45.0 g of potassium peroxodisulphate are introduced at about 10° C. in 5 hours and the dark melt is stirred at 10°–15° C. for 10 hours. 100 ml of 40% strength NaHSO₃ solution are added dropwise at 15°–20° C., the mixture is stirred at 15°–20° C. for 30 minutes and 10.0 g of FeSO₄·7H₂O are added and, after 2–3 hours, heated to 80° C. The solid is filtered off hot with suction, washed with hot water to neutrality and dried at 100° C. 30.8 g of product are isolated, which, apart from the main product 4′,4″,4,5-tetramino-1,1′;8,1″-trianthrimide, also contains 20–30% of triaminodianthrimide.

EXAMPLE 14

A solution of 10.6 g of 1,4-diaminoanthraquinone (92% pure) and 10.0 g of 1,5-diaminoanthraquinone (99% pure) in 200 g of 96% strength H₂SO₄ is converted to a paste in 200 g of water and the melt is oxidised with 24.0 g of potassium peroxodisulphate at 10°–15° C. Working up in accordance with Example 5 provides 17.5 g of 4,4′,8-triamino-1,1′-dianthrimide, which is still contaminated with a little aminopolyanthrimide.

EXAMPLE 15

A solution of 12.2 g of 1,4-diamino-5-nitroanthraquinone (93% pure) and 9.6 g of 1-aminoanthraquinone (98% pure) in 200 g of 90% strength H₂SO₄ is converted to a paste in 200 g of water. After cooling to 10° C., 21.0 g of potassium peroxodisulphate are introduced in 2–3 hours and the melt is stirred at 10°–15° C. for approximately a further 2 hours. Then 15.0 g of hydroquinone are added and, after about 30 minutes, the mixture is briefly heated to 50°–60° C. and, after cooling, the solid is filtered off with suction. The filter cake is initially washed with 40% strength H₂SO₄ and then with hot water to neutrality and dried at 100° L C. 17.4 g of a mixture of the isomeric 5-nitro-4,4′-diamino-1,1′-dianthrimide and 8-nitro-4,4′-diamino-1,1′-dianthrimide, corresponding to 86% of theory, are thus obtained.

EXAMPLE 16

A solution of 12.5 g of 1,4-diamino-2,3-dichloroanthraquinone (98% pure) and 9.6 g of 1-aminoanthraquinone (98% pure) in 180 g of 96% strength sulphuric acid is stirred into 180 g of water. After cooling to 10°–15° C., 22.0 g of potassium peroxodisulphate are introduced in 2–3 hours and the melt is stirred at 15°–20° C. for a further 1–2 hours. Working up and purification in analogy to Example 5 provides 17.7 g of 2,3-dichloro-4,4′-diamino-1,1′-dianthrimide.

EXAMPLE 17

A solution of 15.0 g of 1,4-diamino-2,3-dicyanoanthraquinone (87% pure) and 10.5 g of 1-aminoanthraquinone (98% pure) in 230 g of 96strength H₂SO₄ is stirred into 220 g of water, with cooling. 25.0 g of potassium peroxodisulphate are introduced at 10° C. in 2 hours. After 4 hours at 10°–15° C., 20.0 g of FeSO₄·7H₂O are added and the melt is stirred at 20°–25° C. for 4 hours. After filtering off with suction, washing to neutrality with water and drying at 100° C., 24.2 g of crude product and, after purification via the sulphate, 17.9 g of 2,3-dicyano-4,4′-diamino-1,1′-dianthrimide, corresponding to 78% of theory, are obtained.

I claim:

1. Process for the preparation of 4,4′-diamino-1,1′-dianthrimides, characterized in that a mixture of an optionally substituted 1,4-diaminoanthraquinone and an optionally substituted 1-aminoanthraquinone in 30–60% strength H₂SO₄, is oxidized with peroxomonosulphuric acid or peroxodisulphuric acid, and the product is then reduced.

2. Process according to claim 1, characterised in that the starting components are employed in the molar ratio of optionally substituted 1-aminoanthraquinone to optionally substituted 1,4-diaminoanthraquinone of 0.9:1 to 1.4:1.

3. Process according to claim 1, characterised in that a finely divided mixture of the anthraquinones is employed.

4. Process according to claim 1, characterised in that oxidation is carried out with potassium peroxodisulphate.

5. Process according to claim 1, characterised in that oxidation is carried out in the presence of heavy metal oxides or salts.

6. Process according to claim 1, characterised in that a 1-aminoanthraquinone of the formula I, in which R designates hydrogen and $R_1$, $R_2$, $R_3$, $R_4$ and $R_5$ designate hydrogen, Cl, Br, —$SO_3H$, —COOH, —OH, —$NH_2$, —CN, —$NO_2$, $C_1$-$C_4$-alkyl, phenyl, $C_1$-$C_4$-alkylamino and phenylamino, and a 1,4-diaminoanthraquinone of the formula II, in which $R_6$, $R_7$, $R_8$, $R_9$ and $R_{10}$ designate hydrogen, Cl, Br, —$SO_3H$, —COOH, —OH, —$NH_2$, —CN, —$NO_2$, $C_1$-$C_4$-alkyl, $C_1$-$C_4$-alkylamino and phenylamino, are employed.

7. Process according to claim 1, characterised in that a mixture of 1,4-diaminoanthraquinone and 1-aminoanthraquinone is employed.

8. Process according to claim 1, characterised in that the 1,4-diaminoanthraquinone used is prepared by oxidation of leuco-1,4-diaminoanthraquinone in sulphuric acid and is reacted without intermediate isolation and after converting to a paste with 1-aminoanthraquinone.

9. A process according to claim 1 characterized in that 1-aminoanthraquinones of the formula

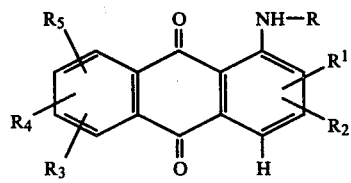

in which
R designates hydrogen, alkyl, cycloalkyl, aryl, aralkyl it being possible for the hydrocarbon radicals mentioned to be substituted and
$R_1$, $R_2$, $R_3$, $R_4$ and $R_5$ designate hydrogen, halogen, —$NO_2$, —$SO_3H$, —COOH, —OH, —$NH_2$, —CN, arylamino, alkylamino, alkyl, cycloalkyl, aryl, aralkyl, alkoxy and aryloxy are employed.

10. A process according to claim 1 characterized in that 1,4-diaminoanthraquinones of the formula

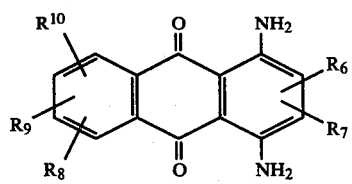

in which
$R_6$, $R_7$, $R_8$, $R_9$ and $R_{10}$ designate hydrogen, halogen, —$NO_2$, —$SO_3H$, —COOH, —OH, —$NH_2$, —CN, arylamino, alkylamino, alkyl, cycloalkyl, aryl, aralkyl, alkoxy and aryloxy are employed.

11. A process according to claim 1 wherein sulphuric acid of a 40–60% strength is employed.

12. A process according to claim 1 wherein the molar ratio of optionally substituted 1-aminoanthraquinone to optionally substituted 1,4-diaminoanthraquinone is 1:1 to 1.1:1.

13. A process according to claim 1 wherein the peroxomonosulphuric acid or peroxodisulphuric acid is in the form of an alkali metal or ammonium salt.

* * * * *